United States Patent
Joncheray et al.

(10) Patent No.: US 11,292,865 B2
(45) Date of Patent: Apr. 5, 2022

(54) POLYISOCYANURATE COMPRISING FOAMS WITH LONG CREAM TIME AND SNAP-CURE BEHAVIOUR

(71) Applicant: Huntsman International LLC, The Woodlands, TX (US)

(72) Inventors: Thomas Julien Joncheray, Woluwe-Saint-Pierre (BE); Jacopo Bernardini, Kessel-Lo (BE); Gilles Jean Geumez, Waterloo (BE); Jan Vandenbroeck, Scherpenheuvel-Zichem (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 28 days.

(21) Appl. No.: 16/958,251

(22) PCT Filed: Oct. 5, 2018

(86) PCT No.: PCT/EP2018/077085
§ 371 (c)(1),
(2) Date: Jun. 26, 2020

(87) PCT Pub. No.: WO2019/141389
PCT Pub. Date: Jul. 25, 2019

(65) Prior Publication Data
US 2020/0339728 A1    Oct. 29, 2020

(30) Foreign Application Priority Data
Jan. 16, 2018 (EP) .................... 18151903

(51) Int. Cl.
| | |
|---|---|
| *C08G 18/48* | (2006.01) |
| *C08G 18/22* | (2006.01) |
| *C08G 18/32* | (2006.01) |
| *C08G 18/42* | (2006.01) |
| *C08G 18/66* | (2006.01) |
| *C08G 18/76* | (2006.01) |
| *C08G 18/79* | (2006.01) |
| *C08J 9/12* | (2006.01) |
| *C08K 3/04* | (2006.01) |

(52) U.S. Cl.
CPC ......... *C08G 18/225* (2013.01); *C08G 18/324* (2013.01); *C08G 18/3206* (2013.01); *C08G 18/42* (2013.01); *C08G 18/48* (2013.01); *C08G 18/6644* (2013.01); *C08G 18/6677* (2013.01); *C08G 18/7664* (2013.01); *C08G 18/794* (2013.01); *C08J 9/125* (2013.01); *C08K 3/04* (2013.01); *C08G 2110/0058* (2021.01); *C08G 2110/0083* (2021.01); *C08J 2203/10* (2013.01)

(58) Field of Classification Search
CPC .............. C08G 18/225; C08G 18/3203; C08G 18/3206; C08G 18/324; C08G 18/42; C08G 18/48; C08G 18/664; C08G 18/6644; C08G 18/6674; C08G 18/6677; C08G 18/7664; C08G 18/794; C08G 2110/0058; C08G 2110/0083; C08J 2203/10; C08K 3/04
See application file for complete search history.

(56) References Cited

U.S. PATENT DOCUMENTS

| | | | |
|---|---|---|---|
| 5,109,031 A | 4/1992 | Snider | |
| 5,627,220 A * | 5/1997 | Matsumoto | .......... C08G 18/325 521/108 |
| 5,847,014 A * | 12/1998 | Nodelman | .......... C08G 18/6564 521/110 |
| 6,207,725 B1 | 3/2001 | Sieker et al. | |
| 6,602,927 B1 | 8/2003 | Rothacker | |
| 9,522,973 B2 * | 12/2016 | Combs | ..................... C08J 9/142 |
| 2015/0118476 A1 * | 4/2015 | Bertucelli | .......... C08G 18/4018 428/304.4 |

OTHER PUBLICATIONS

International Search Report received in corresponding PCT Application No. PCT/EP2018/077085, completed Dec. 17, 2018 and dated Jan. 8, 2019.
Written Opinion received in corresponding PCT Application No. PCT/EP2018/077085, completed Dec. 17, 2018 and dated Jan. 8, 2019.

* cited by examiner

*Primary Examiner* — John M Cooney
(74) *Attorney, Agent, or Firm* — Huntsman International LLC; Robert Diaz

(57) ABSTRACT

A reaction mixture and a process for making a polyisocyanurate comprising rigid foam having a density in the range 50-500 kg/m$^3$ is disclosed, said process having a cream time >35 seconds and a snap cure behaviour.

5 Claims, No Drawings

POLYISOCYANURATE COMPRISING FOAMS WITH LONG CREAM TIME AND SNAP-CURE BEHAVIOUR

CROSS-REFERENCE TO RELATED APPLICATIONS

This application is the National Phase of International Application PCT/EP2018/077085 filed Oct. 5, 2018 which claims priority to European Application No. 18151903.4 filed Jan. 16, 2018. The noted applications are incorporated herein by reference.

FIELD OF INVENTION

The present invention is related to a reaction mixture for making polyisocyanurate comprising cellular materials, in particular polyisocyanurate comprising rigid foams for use in composite materials such as honeycomb structures.

Further the present invention is related to a process for preparing said polyisocyanurate comprising materials thereby achieving both a long cream time and a snap-cure behaviour.

Still further the present invention is concerned with a polyisocyanurate comprising foam suitable for the production of composite materials.

BACKGROUND

Current technology for making polyisocyanurate comprising foams suitable for making composite honeycomb structures have however several processing issues such as a too short cream time and/or a too long cure time.

It is an object of the present invention to provide a reaction mixture which is intended for the production of polyisocyanurate comprising composites and which permits production of polyisocyanurate comprising composites with more processing flexibility especially with regard to cream time and snap cure behaviour.

U.S. Pat. No. 6,602,927 provides polyisocyanurate systems for manufacture of polyisocyanurate foam components. The reaction systems include a polyisocyanate and a polyisocyanate reactive component that includes a trimerization catalyst, polyol, and a carboxylic acid blowing agent, optionally with water as a co-blowing agent. The reaction systems can be blown exclusively with carboxylic acid to produce SRIM (structural reaction injection molding) products which can be demolded with reduced mold residence time. US'927 however does not give enough processing flexibility for mainly water blown (having at least 50 mol % water based on the total molar amount of all blowing agents used) polyisocyanurate systems especially with regard to cream time and snap cure behaviour.

U.S. Pat. No. 5,109,031 is dealing with rigid cellular low density polymers made by reacting an organic polyisocyanate with a polyol component comprising a polyester polyol having a free glycol content of less than about 7 percentage by weight of the polyester polyol in the presence of a blowing agent. The aim of US'031 is to improve thermal insulation properties, US'031 however does not give enough processing flexibility for mainly water blown (having at least 50 mol % water based on the total molar amount of all blowing agents used) higher density polyisocyanurate cellular systems especially with regard to cream time and snap cure behaviour.

U.S. Pat. No. 6,207,725 is also dealing with a process for making rigid polyurethane or urethane-modified polyisocyanurate foams made by reacting an organic polyisocyanate composition with an isocyanate-reactive composition comprising a polyester polyol in the presence of an amine catalyst. The aim of US'725 is to achieve a fast initial foam rise. US'725 hence does not give any processing details for mainly water blown (having at least 50 mol % water based on the total molar amount of all blowing agents used) thereby achieving a long cream time and snap cure behaviour.

It is a goal of the invention to improve the processing for making polyisocyanurate foamed materials suitable for use in composite materials such as honeycomb structures.

The goal is to achieve polyisocyanurate comprising foam formation while achieving both a long cream time of at least 35 seconds and a snap-cure behaviour. A snap cure behaviour will lead to more efficient curing and will reduce cycle time while a long cream time will allow flexibility in the handling time e.g. sufficient time to spray the reaction mixture and/or fill a mould before curing.

Surprisingly we have found a reaction mixture for making polyisocyanurate comprising foams which lead to both a long cream time and a snap-cure behaviour.

The reaction mixture of the present invention leads to a prolonged cream time and a snap-cure behaviour which allows easier processing on laminating machines and potentially also allows moulding PIR foams which is currently not possible using state of the art reaction mixtures because of the foaming kinetics restrictions of state of the art reaction mixtures.

SUMMARY OF THE INVENTION

According to a first aspect, a reaction mixture for making a polyisocyanurate (PR) comprising foam having a density in the range 50-500 kg/m$^3$ is disclosed, said reaction mixture having an isocyanate index of at least 200 and comprising at least:
  polyisocyanate composition comprising one or more polyisocyanate compounds;
  a catalyst composition comprising at least a trimerization catalyst compound in an amount of at least 50 wt % based on the total weight of all catalyst compounds in the catalyst composition;
  an isocyanate-reactive composition comprising at least a low molecular weight (MW) polyol having a MW below 200 g/mol in an amount of 0.1 up to 30 wt % based on the total weight of the isocyanate-reactive composition;
  one or more blowing agents comprising at least 50 mol % water based on the total molar amount of blowing agents;
  optionally one or more surfactants, one or more flame retardants, one or more antioxidants or combinations thereof;
  wherein the wt % of the trimerization catalyst compounds is <0.5 wt % based on the total weight of the trimerization catalyst compounds+polyisocyanate composition.

According to embodiments, the wt % of the trimerization catalyst compounds is <0.5 wt %, preferably <0.45 wt %, more preferred <0.4 wt %, most preferred <0.35 wt % based on the total weight of the catalyst composition+polyisocyanate composition.

According to embodiments, the wt % of the trimerization catalyst compounds is <0.3 wt % based on the total weight of the catalyst composition+polyisocyanate composition.

According to embodiments, the trimerization catalyst compound is selected from organic salts, preferably from alkali metal, earth alkali metal and/or quaternary ammonium organic salts such as potassium acetate, potassium hexanoate, potassium ethylhexanoate, potassium octanoate, potassium lactate, N-hydroxypropyl trimethyl ammonium octanoate, N-hydroxypropyl trimethyl ammonium formate and mixtures thereof.

According to embodiments, the low molecular weight (MW) polyol has a molecular weight below 150 g/mol, preferably below 100 g/mol.

According to embodiments, the low molecular weight (MW) polyol is selected from glycerol and/or ethylene glycol.

According to embodiments, the amount of low molecular weight (MW) polyol is in the range 1 up to 25 wt %, more preferably 2 up to 20 wt % based on the total weight of the isocyanate-reactive composition.

According to embodiments, the amount of trimerisation catalyst compound(s) is at least 75 wt %, preferably at least 90 wt % based on the total weight of all catalyst compounds in the catalyst composition.

According to embodiments, the polyisocyanate compounds are selected from a toluene diisocyanate, a methylene diphenyl diisocyanate or a polyisocyanate composition comprising a methylene diphenyl diisocyanate or a mixture of such polyisocyanates.

According to embodiments, the one or more isocyanate reactive compounds in the reaction mixture further comprise monools and/or polyols which have an average nominal hydroxy functionality of 1-8 and a number average molecular weight in the range 200-8000 g/mol and mixtures of said monools and/or polyols such as polyether polyols and polyester polyols, mercaptans, carboxylic acids such as polybasic acids, amines, polyamines.

According to embodiments, the blowing agent is selected from water, isobutene, dimethyl ether, methylene chloride, acetone, chlorofluorocarbons (CFCs), hydrofluorocarbons (HFCs), hydrochlorofluorocarbons (HCFCs), hydrofluoroolefins (HFOs) and/or hydrocarbons and is present in an amount of 0.1 to 80 parts by weight (pbw), preferably from 0.2 to 60 pbw calculated per hundred weight parts of the one or more isocyanate reactive compounds.

According to a second aspect, a process for making a polyisocyanurate comprising rigid foam having a density in the range 50-500 kg/m$^3$ is disclosed, said process having a cream time >35 seconds and a snap cure behaviour and comprising combining and mixing at an isocyanate index of at least 200 the components of the reaction mixture according to the first aspect to obtain a foam.

According to embodiments, the cream time is >45 seconds, more preferably >55 seconds and a snap cure behaviour <110 seconds, preferably <90 seconds, more preferably <70 seconds.

According to embodiments, the isocyanate index is higher than 220, preferably higher than 250.

According to a third aspect, a polyisocyanurate comprising material obtained by the process according to the second aspect is disclosed.

According to embodiments, the polyisocyanurate comprising material according to the invention is having a free rise density (measured according to ISO 845) in the range between 50 kg/m$^3$ up to 500 kg/m$^3$, preferably in the range 75 kg/m$^3$ up to 300 kg/m$^3$, more preferably in the range 100 kg/m$^3$ up to 200 kg/m$^3$.

According to a fourth aspect, the use of the polyisocyanurate comprising material according to the invention in composite honeycomb structures is disclosed.

The independent and dependent claims set out particular and preferred features of the invention. Features from the dependent claims may be combined with features of the independent or other dependent claims as appropriate.

The above and other characteristics, features and advantages of the present invention will become apparent from the following detailed description. This description is given for the sake of example only, without limiting the scope of the invention.

Definitions and Terms

In the context of the present invention the following terms have the following meaning:

1) "isocyanate index" or NCO index or index:
   the ratio of NCO-groups over isocyanate-reactive hydrogen atoms present in a formulation, given as a percentage:

$$\frac{[NCO] \times 100}{[\text{active hydrogen}]} (\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.

2) The expression "isocyanate-reactive compounds" and "isocyanate-reactive hydrogen atoms" as used herein for the purpose of calculating the isocyanate index refers to the total of active hydrogen atoms in hydroxyl and amine groups present in the isocyanate reactive compounds; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) "Reaction system": a combination of compounds wherein the polyisocyanates are kept in one or more containers separate from the isocyanate-reactive components.

4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

5) The word "average" refers to number average unless indicated otherwise.

6) "Trimerization catalyst" as used herein refers to a catalyst being able to catalyse (promote) the formation of isocyanurate groups from polyisocyanates. This means that isocyanates can react with other isocyanates to form macromolecules with isocyanurate structures (polyisocyanurate=PIR). Reactions between isocyanates-polyols and isocyanates-isocyanates (homopolymerization) can take place simultaneously or in direct succession, forming macromolecules with urethane and isocyanurate structures (PIR-PUR).
7) "Polyisocyanurate comprising material" (foam) refers to a material composition comprising urethane and isocyanurate structures (PIR-PUR) made at an isocyanate index of 200 or higher, more preferably at an isocyanate index higher than 220.
8) "Free rise density" refers to density measured on foam samples made under atmospheric conditions (in the presence of blowing agents) according to ISO 845.
9) "Cream time" refers to the time required for the reaction mixture to change from the liquid state to a creamy state and starts to foam (expand) subsequently.
10) "Snap cure behaviour" or "rapid cure" refers to a reduced or minimal difference between tack free time and cream time. Curing time is often also referred to as demolding time. Tack free time (TFT) is the period of time from the start of cure to a point at which the outer skin of the foam loses its stickiness. It can be determined by pressing a polyethylene film against the surface and checking for any adhering material when the film is removed.

DETAILED DESCRIPTION

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

It is to be understood that although preferred embodiments and/or materials have been discussed for providing embodiments according to the present invention, various modifications or changes may be made without departing from the scope and spirit of this invention.

The present invention relates to a reaction system such that both a long cream time (>35 seconds) and a rapid cure (snap cure behaviour) are achieved. The invention further relates to a process for making polyisocyanurate comprising foams, more particularly for making polyisocyanurate comprising rigid foams for use in composite materials such as honeycomb structures thereby using the reaction system of the current invention.

According to a first aspect of the invention, a reaction system for making a polyisocyanurate comprising foam having a free rise density in the range 50-500 kg/m$^3$ (measured according to ISO 845) is disclosed. Said reaction system comprising at least:
- a polyisocyanate composition comprising one or more polyisocyanate compounds;
- a catalyst composition comprising at least a trimerization catalyst compound in an amount of at least 50 wt % based on the total weight of all catalyst compounds in the catalyst composition;
- an isocyanate reactive composition comprising at least a low molecular weight (MW) polyol having a MW below 200 g/mol in an amount of 0.1 up to 30 wt % based on the total weight of the isocyanate-reactive composition;
- one or more blowing agents comprising at least 50 mol % water based on the total molar amount of blowing agents;
- optionally providing one or more surfactants, one or more flame retardants, one or more antioxidants or combinations thereof;
- wherein the wt % of the trimerization catalyst compounds is <0.5 wt % based on the total weight of the catalyst composition+polyisocyanate composition.

According to embodiments, the wt % of the trimerization catalyst compounds is <0.5 wt %, preferably <0.45 wt %, more preferred <0.4 wt %, most preferred <0.35 wt % based on the total weight of the catalyst composition+polyisocyanate composition.

According to embodiments, the wt % of the trimerization catalyst compounds is <0.30 wt % based on the total weight of the catalyst composition+polyisocyanate composition.

According to embodiments, the low molecular weight (MW) polyol has a molecular weight below 200 g/mol, preferably below 150 g/mol, more preferably below 100 g/mol.

An advantage of the reaction mixture of the present invention is that it can be used to achieve both a long cream time and a short curing time involving polyisocyanurate (PIR) formation. This combined effect leads to a reduced production cycle time, for instance in composite applications.

According to embodiments, the catalyst composition comprises at least a trimerization catalyst compound in an amount of at least 75 wt %, more preferably in an amount of at least 90 wt % based on the total weight of all catalyst compounds in the catalyst composition.

According to a preferred embodiment of the first aspect of the invention, the trimerization catalyst is selected from organic salts, preferably from alkali metal, earth alkali metal and/or quaternary ammonium organic salts. More preferably said organic salt is selected from carboxylates or alkoxides and mixtures thereof, the carboxylate/alkoxide group preferably having 1-12 carbon atoms and mixtures thereof. Preferred examples are potassium carboxylates, sodium carboxylates, potassium alkoxides and sodium alkoxides. Also carboxylates/alkoxides having ring structures such as sodium or potassium benzoate are suitable trimerization catalysts. Most preferred examples are potassium acetate, potassium hexanoate, potassium ethylhexanoate, potassium octanoate, potassium lactate, N-hydroxypropyl trimethyl ammonium octanoate, N-hydroxypropyl trimethyl ammonium formate and mixtures thereof. Suitable catalysts are commercially available; examples are Catalyst LB from Huntsman or Dabco® K2097 from Air Products (comprising potassium acetate), and Dabco® K15 (comprising potassium octoate).

According to embodiments, the low molecular weight (MW) polyol having a MW below 200 g/mol is present in the reaction mixture in an amount of 0.1 up to 30 wt %, preferably 1 up to 25 wt %, more preferably 2 up to 20 wt % based on the total weight of the isocyanate-reactive composition.

According to embodiments, the one or more isocyanate reactive compounds having low molecular weight are selected from monools and/or polyols such as glycols. Suitable examples are monools selected from methanol, ethanol, propanol, butanol, phenol, cyclohexanol and hydrocarbon monools having a number average molecular weight up to 200 g/mol like aliphatic and polyether monools and/or polyols selected from monoethylene glycol, diethylene glycol, triethylene glycol, propylene glycol, dipropylene glycol, tripropylene glycol, trimethylol propane, sorbitol, glycerol, propanediol, butanediol, pentanediol, hexanediol, aromatic and/or aliphatic polyols having a molecular weight <200, preferably <150 g/mol, more preferably <100 g/mol.

According to embodiments, the isocyanate reactive composition further comprises beside the low MW polyol a high molecular weight polyol having a number average molecular weight of preferably 200-8000 and an average nominal functionality of preferably 1-8. Said high molecular weight polyol may be selected from polyether polyols, polyester polyols, mercaptans, carboxylic acids such as polybasic acids, amines, polyamines having an average nominal hydroxy functionality of 1-8 and a number average molecular weight of up to 8000 and mixtures thereof. Examples of suitable polyols are Hoopol® F-1390 (a polyester polyol from Synthesia) and Daltolac® R-166 (a polyether polyol from Huntsman).

According to a second aspect of the invention, a process for making a polyisocyanurate comprising foam is disclosed thereby using the reaction mixture of the invention. Said process therefore comprises combining and mixing the ingredients of the reaction mixture at an isocyanate index of at least more than 200, preferably an isocyanate index of 220 or higher.

According to embodiments, the process for making a polyisocyanurate comprising foam according to the invention leads both to a cream time >35 seconds, preferably >45 seconds, more preferably >55 seconds and a snap cure behaviour <110 seconds, preferably <90 seconds, more preferably <70 seconds.

There are many different orders of contacting or combining the compounds required to make the polyisocyanurate comprising foam of the present invention. One of skill in the art would realize that varying the order of addition of the compounds falls within the scope of the present invention.

According to embodiments, the polyisocyanate compounds used in the reaction mixture for making a PIR comprising foam according to the invention are selected from organic isocyanates containing a plurality of isocyanate groups including aliphatic isocyanates such as hexamethylene diisocyanate and more preferably aromatic isocyanates such as m- and p-phenylene diisocyanate, tolylene-2,4- and 2,6-diisocyanates, diphenylmethane-4,4'-diisocyanate, chlorophenylene-2,4-diisocyanate, naphthylene-1,5-diisocyanate, diphenylene-4,4'-diisocyanate, 4,4'-diisocyanate-3, 3'-dimethyldiphenyl, 3-methyldiphenylmethane-4,4'-diisocyanate and diphenyl ether diisocyanate, cycloaliphatic diisocyanates such as cyclohexane-2,4- and 2,3-diisocyanates, 1-methyl cyclohexyl-2,4- and 2,6-diisocyanates and mixtures thereof and bis-(isocyanatocyclohexyl-)methane and triisocyanates such as 2,4,6-triisocyanatotoluene and 2,4,4'-triisocyanatodiphenyl ether.

According to embodiments, the polyisocyanate composition comprises mixtures of polyisocyanates. For example a mixture of tolylene diisocyanate isomers such as the commercially available mixtures of 2,4- and 2,6-isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher polyisocyanates together with any phosgenation by-products.

Preferred polyisocyanate compositions of the present invention are those wherein the polyisocyanate is an aromatic diisocyanate or polyisocyanate of higher functionality in particular crude mixtures of methylene bridged polyphenyl polyisocyanates containing diisocyanates, triisocyanate and higher functionality polyisocyanates. Methylene bridged polyphenyl polyisocyanates (e.g. Methylene diphenyl diisocyanate, abbreviated as MDI) are well known in the art and have the generic formula I wherein n is one or more and in the case of the crude mixtures represents an average of more than one. They are prepared by phosgenation of corresponding mixtures of polyamines obtained by condensation of aniline and formaldehyde.

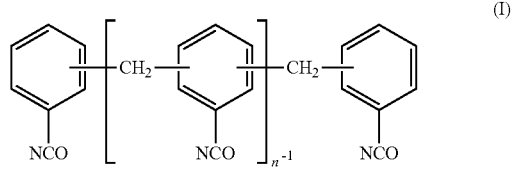

(I)

Other suitable polyisocyanate compositions may include isocyanate ended prepolymers made by reaction of an excess of a diisocyanate or higher functionality polyisocyanate with a hydroxyl ended polyester or hydroxyl ended polyether and products obtained by reacting an excess of diisocyanate or higher functionality polyisocyanate with a monomeric polyol or mixture of monomeric polyols such as ethylene glycol, trimethylol propane or butane-diol. One preferred class of isocyanate-ended prepolymers are the isocyanate ended prepolymers of the crude mixtures of methylene bridged polyphenyl polyisocyanates containing diisocyanates, triisocyanates and higher functionality polyisocyanates.

According to embodiments, the polyisocyanate compounds in the polyisocyanate composition are selected from a toluene diisocyanate, a methylene diphenyl diisocyanate or a polyisocyanate composition comprising a methylene diphenyl diisocyanate or a mixture of such polyisocyanates.

According to embodiments, the isocyanate index is higher than 200, preferably higher than 220, more preferably higher than 250. For example the isocyanate index may range from 200 to 1000, from 200 to 600, or from 200 to 400.

Using reaction mixtures having isocyanate index >200 (leading to isocyanurate formulations) in e.g. composite honeycomb applications provides several advantages over reaction mixtures having isocyanate index around 100 (leading to polyurethane formulations). For instance, the exotherm released is typically higher which results in lower mould temperatures necessary to achieve resin curing (i.e.

energy savings), the high aromatic content of reaction mixtures having isocyanate index >200 provides the final composites better fire properties, and the high crosslink density results in enhanced mechanical properties (higher Tg, . . . ).

According to embodiments, the blowing agent is preferably water used alone or in combination with alternative blowing agents. Alternative blowing agent may be selected from isobutene, dimethyl ether, methylene chloride, acetone, chlorofluorocarbons (CFCs), hydrofluorocarbons (HFCs), hydrochlorofluorocarbons (HCFCs), hydrofluoroolefins (HFOs) and hydrocarbons such as pentane. The amount of blowing agent used can vary based on, for example, the intended use and application of the foam product and the desired foam stiffness and density. The blowing agent may be present in amounts from 0.1 to 80 parts by weight (pbw) per hundred weight parts isocyanate reactive compounds (polyol) including the weight contribution of the catalyst composition, more preferably from 0.2 to 60 pbw.

According to embodiments, one or more urethane catalyst compounds may be added to the reaction mixture if needed although a trimerisation catalyst compound should be present in an amount of >50 wt % based on the total weight of all catalyst compounds used. Urethane catalysts suitable for use herein include, but are not limited to, metal salt catalysts, such as organotins, and amine compounds, such as triethylenediamine (TEDA), N-methylimidazole, 1,2-dimethylimidazole, N-methylmorpholine, N-ethylmorpholine, triethylamine, N,N'-dimethylpiperazine, 1,3,5-tris(dimethylaminopropyl)hexahydrotriazine, 2,4,6-tris(dimethylaminomethyl)phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylaminocyclohexylamine, pentamethyldipropylene-triamine, triethanolamine, dimethylethanolamine, bis(dimethylaminoethyl)ether, tris(3-dimethylamino)propylamine, or its acid blocked derivatives, and the like, as well as any mixture thereof.

The present invention further relates to a polyisocyanurate comprising foam made using the process according to the invention and making use of the reaction mixture disclosed in the present invention and the use of said foam in e.g. composite materials such as fiber reinforced honeycomb composite structures for fast cycle automotive applications (parcel shelves, load floors, headliners, trays, semi structural components . . . ).

According to embodiments, the polyisocyanurate comprising material according to the invention has a free rise density (measured according to ISO 845) in the range between 50 kg/m$^3$ up to 500 kg/m$^3$, preferably in the range 75 kg/m$^3$ up to 300 kg/m$^3$, more preferably in the range 100 kg/m$^3$ up to 200 kg/m$^3$.

According to preferred embodiments, a composite material having composite honeycomb structures with a core layer comprising the polyisocyanurate comprising material made according to the invention is disclosed.

According to embodiments, the reaction mixture of the instant invention may be applied by means of spraying after the required ingredients were mixed at the departure point from a spray nozzle onto e.g. a honeycomb structure or into a mold.

According to embodiments, the polyisocyanurate comprising foam of the instant invention may be used in e.g. honeycomb structures. The polyisocyanurate comprising foam of the instant invention fulfills all the requirements to allow sufficient time for the reaction mixture to be sprayed homogeneously on a substrate such as e.g. a glass fiber or honeycomb assembly and/or to insert it inside a heated compression mould where curing is then performed, while a snap-cure behaviour is preferred to minimize cycle time.

EXAMPLES

Chemicals used:
Hoopol® F-1390: Polyester polyol from Synthesia (OH value: 240 mgKOH/g)
Daltolac® R-166: Polyether polyol from Huntsman (OH value: 165 mgKOH/g)
Tegostab® B8490: Silicon surfactant from Evonik (OH value: 0 mgKOH/g)
LB Catalyst: Potassium acetate PIR catalyst from Huntsman (OH value: 865 mgKOH/g, 48.2 wt % potassium acetate, 48.2 wt % MEG, 3.6 wt % water)
DETDA: DiEthylTolueneDiAmine from Lonza (OH value: 630 mgKOH/g), used as chain extender
DABCO® 33LV: Gelling catalyst from Air Products (OH value: 560 mgKOH/g, 33 wt % TEDA TriethyleneDiAmine in dipropylene glycol)
Jeffcat PMDETA: PentaMethylDiethyleneTriAmine, blowing catalyst from Huntsman (OH value: 0 mgKOH/g)
Glycerol: from Huntsman (OH value: 1826 mgKOH/g)
MEG: MonoEthylene Glycol from Sigma-Aldrich (OH value: 1808 mgKOH/g)
Black Repitan 90655: carbon black dispersion in polyether polyol from REPI (OH value: 30 mgKOH/g)
IMR VP063235: Internal mould release from KVS Eckert & Woelk
S2085: Suprasec® 2085 from Huntsman (Polymeric MDI, NCO value: 30.5)
S5025: Suprasec® 5025 from Huntsman (Polymeric MDI, NCO value: 31.0)
Suprasec® and Daltolac® are trademarks of the Huntsman Corporation or an Affiliate thereof and have been registered in one or more but not all countries.

Examples 1-7 and Comparative Examples 1-2

All foams were produced under free rise conditions in cup scale (~120 g) by mixing under high shear with a Heidolph Mixer (~4000 rpm) for 10 seconds the polyol blend (prepared beforehand) and the Isocyanate. Foam density was measured according to standard test method ISO845.

Table 1 summarizes the amounts of ingredients used in pbw (parts by weight) to fabricate foams according to the present invention (examples 1-7) and to fabricate comparative foams (comparative examples 1-2).

Compared to comparative example 1 (no low MW polyol present), Examples 1 and 2 evidence that the presence of increasing amounts of glycerol both delays cream time (55 seconds→65 seconds→70 seconds) and improves the snap cure behaviour with a decreased Δt (45 seconds→40 seconds→40 seconds). In other words, the snap cure behaviour is improved in the presence of glycerol while not decreasing cream time (i.e. keeping a long cream time).

A similar trend is observed looking at comparative example 2 and examples 4, 5, 6 and 7 which contain increasing amounts of MEG (CT: 47 seconds→67 seconds→82 seconds→87 seconds→112 seconds; Δt: 103 seconds→83 seconds→58 seconds→28 seconds→28 seconds). The presence of MEG improves the snap cure behaviour while not decreasing cream time.

Comparing example 3 and comparative example 1 evidences that increasing both the amount of PR catalyst and low Mw polyol (glycerol in this specific case) can allow to keep a constant cream time (55 seconds in this specific case, i.e. not decreased) while improving dramatically the snap cure behaviour (Δt drops from 45 seconds to 25 seconds).

All these examples therefore evidence that the presence of both PR catalyst and low Mw polyol allows to keep a long cream time (>35 seconds) and to improve the snap-cure behaviour (decreased Δt).

achieve a similar CT (58 seconds) as Comparative Example 3 (55 seconds) while achieving a much faster cure (Δt=57 seconds versus 365 seconds).

Compared to comparative example 4 (no low MW polyol present), examples 8, 9, 10, 11 and 12 evidence that the presence of increasing amounts of glycerol both delays cream time (32 seconds→38 seconds→42 seconds→48 seconds→58 seconds→65 seconds) and improves the snap cure behaviour with a decreased Δt (166 seconds→107 seconds→73 seconds→52 seconds→57 seconds→50 sec-

TABLE 1

| Chemical (pbw) | Comp Ex. 1 | Ex.1 | Ex.2 | Ex.3 | Comp Ex. 2 | Ex.4 | Ex.5 | Ex.6 | Ex.7 |
|---|---|---|---|---|---|---|---|---|---|
| Hoopol F-1390 | 98.23 | 98.23 | 98.23 | 98.23 | 52.2 | 52.2 | 52.2 | 52.2 | 52.2 |
| Water | 1 | 1 | 1 | 1 | 1 | 1 | 1 | 1 | 1 |
| Tegostab B 8490 | 1.77 | 1.77 | 1.77 | 1.77 | 1.77 | 1.77 | 1.77 | 1.77 | 1.77 |
| LB Catalyst | 1 | 1 | 1 | 1.25 | 1 | 1 | 1 | 1 | 1 |
| DETDA | 4 | 4 | 4 | 4 | 4 | 4 | 4 | 4 | 4 |
| Glycerol | — | 2 | 3 | 3 | — | — | — | — | — |
| MEG | — | — | — | — | — | 2 | 5 | 10 | 15 |
| Black Repitan 90655 | — | — | — | — | 4 | 4 | 4 | 4 | 4 |
| IMR VP063235 | — | — | — | — | 7.5 | 7.5 | 7.5 | 7.5 | 7.5 |
| S2085 | 231.47 | 231.47 | 231.47 | 231.47 | — | — | — | — | — |
| S5025 | — | — | — | — | 270 | 270 | 270 | 270 | 270 |
| wt % trimerization catalyst compound(s) towards all catalyst compounds (*) | 100 | 100 | 100 | 100 | 100 | 100 | 100 | 100 | 100 |
| wt % trimerization catalyst compounds towards Iso (**) | 0.208 | 0.208 | 0.208 | 0.260 | 0.178 | 0.178 | 0.178 | 0.178 | 0.178 |
| Iso Index | 284 | 256 | 244 | 243 | 502 | 432 | 357 | 277 | 226 |
| Density (kg/m$^3$) | 122.4 | 131.8 | 130.7 | 136 | 136 | 131.2 | 127.5 | 96.6 | 122.4 |
| Cream Time (s) | 55 | 65 | 70 | 55 | 47 | 67 | 82 | 87 | 112 |
| Tack Free Time (s) | 100 | 105 | 110 | 80 | 150 | 150 | 140 | 115 | 140 |
| EoR (s) | 130 | 140 | 143 | 120 | 285 | 230 | 205 | 170 | 160 |
| Δt (s) (TFT-CT) | 45 | 40 | 40 | 25 | 103 | 83 | 58 | 28 | 28 |

(*) Amount (wt %) of trimerization catalyst compounds based on the total weight of all catalyst compounds.
(**) Amount (wt %) of trimerization catalyst compounds based on the total weight of all trimerization catalyst compounds + isocyanate compounds.

Examples 8-14 and Comparative Examples 3-4

Similar foam production method was used as for examples 1-7 and comparative examples 1-2.

Table 2 summarizes the amounts of ingredients used in pbw (parts by weight) to fabricate foams according to the present invention (examples 8-14) and to fabricate comparative foams (comparative examples 3-4).

Comparative examples 3 and 4 evidence that although the snap-cure behaviour is improved (decreased Δt from 365 seconds to 166 seconds) when increasing the amount of PR catalyst, in the absence of low MW polyol cream time (CT) is also significantly decreased (55 seconds towards 32 seconds), which is not desired. In Example 11, the presence of glycerol and a higher amount of PIR catalyst allows to onds). In other words, the snap cure behaviour is improved in the presence of glycerol while not decreasing cream time (i.e. keeping a long cream time).

A similar trend is observed looking at comparative example 4 and examples 13 and 14, which contain increasing amounts of MEG (Cream Time: 32 seconds→40 seconds→45 seconds; Δt: 166 seconds→40 seconds→20 seconds). The presence of MEG improves the snap cure behaviour while not decreasing cream time.

All these examples therefore evidence that the presence of both PIR catalyst and low MW polyol allows to keep a long cream time (>35 seconds) and to improve the snap-cure behaviour (decreased Δt).

Using polyesters (e.g. Hoopol® F-1390) or polyethers (e.g Daltolac® R 166) does not influence the trends of the effect of PIR catalyst and/or low MW polyol on foaming kinetics and snap-curing behaviour.

TABLE 2

| Chemical (pbw) | Comp ex. 3 | Comp Ex. 4 | Ex. 8 | Ex. 9 | Ex. 10 | Ex. 11 | Ex. 12 | Ex. 13 | Ex. 14 |
|---|---|---|---|---|---|---|---|---|---|
| Daltolac R 166 | 72.2 | 72.2 | 72.2 | 72.2 | 72.2 | 72.2 | 72.2 | 72.2 | 72.2 |
| Water | 1 | 1 | 1 | 1 | 1 | 1 | 1 | 1 | 1 |
| Tegostab B 8490 | 1.77 | 1.77 | 1.77 | 1.77 | 1.77 | 1.77 | 1.77 | 1.77 | 1.77 |
| LB Catalyst | 0.3 | 0.5 | 0.5 | 0.5 | 0.5 | 0.5 | 0.5 | 0.5 | 0.5 |
| DETDA | 4 | 4 | 4 | 4 | 4 | 4 | 4 | 4 | 4 |
| Glycerol | — | — | 2 | 5 | 7.5 | 9 | 10 | — | — |
| MEG | — | — | — | — | — | — | — | 10 | 15 |
| Black Repitan 90655 | 4 | 4 | 4 | 4 | 4 | 4 | 4 | 4 | 4 |
| IMR VP063235 | 7.5 | 7.5 | 7.5 | 7.5 | 7.5 | 7.5 | 7.5 | 7.5 | 7.5 |
| S5025 | 250 | 250 | 250 | 250 | 250 | 250 | 250 | 250 | 250 |
| Iso Index | 492 | 488 | 416 | 341 | 297 | 275 | 262 | 263 | 212 |
| wt % trimerization catalyst compound(s) towards all catalyst compounds (*) | 100 | 100 | 100 | 100 | 100 | 100 | 100 | 100 | 100 |
| wt % trimerization catalyst compounds towards Iso (**) | 0.058 | 0.096 | 0.096 | 0.096 | 0.096 | 0.096 | 0.096 | 0.096 | 0.096 |
| Density (kg/m$^3$) | 160.4 | 140.6 | 132.3 | 106.1 | 106.5 | 112.2 | 98.3 | 103.5 | 93.2 |
| Cream Time (s) | 55 | 32 | 38 | 42 | 48 | 58 | 65 | 40 | 45 |
| Tack FreeTime (s) | 420 | 198 | 145 | 115 | 100 | 115 | 115 | 80 | 65 |
| EoR (s) | 360 | 270 | 175 | 160 | 130 | 145 | 150 | 105 | 85 |
| Δt (s) (TFT-CT) | 365 | 166 | 107 | 73 | 52 | 57 | 50 | 40 | 20 |

(*) Amount (wt %) of trimerization catalyst compounds based on the total weight of all catalyst compounds.
(**) Amount (wt %) of trimerization catalyst compounds based on the total weight of all trimerization catalyst compounds + isocyanate compounds.

Example 10 and Comparative Examples 5-10

Similar foam production method was used as for examples 1-7 and comparative examples 1-2.

Table 3 summarizes the amounts of ingredients used in pbw (parts by weight) to fabricate foams according to the present invention (example 10) and to fabricate comparative foams (comparative examples 5-10).

Example 10 is the same example as illustrated in Table 2.

Compared to Example 10, comparative examples 5, 6, 7, 8, 9 and 10 evidence that the presence of large amounts of polyurethane gelling and blowing catalysts decreases cream time significantly below 35 seconds while even deteriorating the snap-cure behaviour (comparative examples 6, 7, 9 and 10).

TABLE 3

| Chemical (pbw) | Ex. 10 | Comp ex. 5 | Comp ex. 6 | Comp ex. 7 | Comp ex. 8 | Comp ex. 9 | Comp ex. 10 |
|---|---|---|---|---|---|---|---|
| Daltolac R 166 | 72.2 | 72.2 | 72.2 | 72.2 | 72.2 | 72.2 | 72.2 |
| Water | 1 | 1 | 1 | 1 | 1 | 1 | 1 |
| Tegostab B 8490 | 1.77 | 1.77 | 1.77 | 1.77 | 1.77 | 1.77 | 1.77 |
| DETDA | 4 | 4 | 4 | 4 | 4 | 4 | 4 |
| LB Catalyst | 0.5 | 0.5 | 0.17 | 0.08 | 0.5 | 0.17 | 0.08 |
| Glycerol | 7.5 | 7.5 | 2.5 | 1.25 | 7.5 | 2.5 | 1.25 |
| PMDETA | — | 0.2 | 0.07 | 0.03 | 0.2 | 0.07 | 0.03 |
| 33LV | — | 1.5 | 0.5 | 0.25 | 4.5 | 1.5 | 0.75 |
| Black Repitan 90655 | 4 | 4 | 4 | 4 | 4 | 4 | 4 |
| IMR VP063235 | 7.5 | 7.5 | 7.5 | 7.5 | 7.5 | 7.5 | 7.5 |
| wt % trimerization catalyst compound(s) towards all catalyst compounds (*) | 100 | 25.7 | 25.9 | 25.2 | 12.5 | 12.7 | 12.0 |
| S5025 | 250 | 250 | 250 | 250 | 250 | 250 | 250 |
| Wt % trimerization catalyst compounds towards Iso (**) | 0.096 | 0.096 | 0.033 | 0.015 | 0.096 | 0.033 | 0.015 |
| Iso Index | 297 | 290 | 402 | 445 | 277 | 393 | 439 |
| Density (kg/m$^3$) | 106.5 | 147.4 | 180.7 | 234.3 | 150.8 | 168.3 | 174.2 |
| CT (s) | 48 | 9 | 15 | 22 | 7 | 12 | 19 |

TABLE 3-continued

| Chemical (pbw) | Ex. 10 | Comp ex. 5 | Comp ex. 6 | Comp ex. 7 | Comp ex. 8 | Comp ex. 9 | Comp ex. 10 |
|---|---|---|---|---|---|---|---|
| TFT (s) | 100 | 60 | 840 | 2400 | 45 | 360 | 1200 |
| EoR (s) | 130 | 37 | 115 | 215 | 35 | 70 | 140 |
| Δt (s) (TFT-CT) | 52 | 51 | 825 | 2378 | 38 | 348 | 1181 |

(*) Amount (wt %) of trimerization catalyst compounds based on the total weight of all catalyst compounds.
(**) Amount (wt %) of trimerization catalyst compounds based on the total weight of all trimerization catalyst compounds + isocyanate compounds.

Example 3 and Comparative Examples 11-13

Similar foam production method was used as for examples 1-7 and comparative examples 1-2.

Table 4 summarizes the amounts of ingredients used in pbw (parts by weight) to fabricate a foam according to the present invention (example 3) and to fabricate comparative foams (comparative examples 11, 12 and 13).

Example 3 is the same example as illustrated in Table 1.

Compared to Example 3, Comparative examples 11, 12 and 13 evidence that if the amount of PIR catalyst is too high (i.e. >0.5 wt %), despite the presence of glycerol, cream time is decreased significantly down to values below 35 s.

TABLE 4

| Chemical (pbw) | Ex. 3 | Comp Ex. 11 | Comp Ex. 12 | Comp Ex. 13 |
|---|---|---|---|---|
| Hoopol F-1390 | 98.23 | 98.23 | 98.23 | 98.23 |
| Water | 1 | 1 | 1 | 1 |
| Tegostab B 8490 | 1.77 | 1.77 | 1.77 | 1.77 |
| LB Catalyst | 1.25 | 2.5 | 3.0 | 3.5 |
| DETDA | 4 | 4 | 4 | 4 |
| Glycerol | 3 | 3 | 3 | 3 |
| S2085 | 231.47 | 231.47 | 231.47 | 231.47 |
| wt % trimerization catalyst compound(s) towards all catalyst compounds (*) | 100 | 100 | 100 | 100 |
| wt % trimerization catalyst compounds towards Iso (**) | 0.260 | 0.518 | 0.621 | 0.724 |
| Iso Index | 243 | 236 | 233 | 231 |
| Density (kg/m³) | 136 | 109 | 104 | 104 |
| Cream Time (s) | 55 | 33 | 30 | 25 |
| Tack Free Time (s) | 80 | 45 | 40 | 30 |
| EoR (s) | 120 | 70 | 55 | 50 |
| Δt (s) (TFT-CT) | 25 | 12 | 10 | 5 |

(*) Amount (wt %) of trimerization catalyst compounds based on the total weight of all catalyst compounds.
(**) Amount (wt %) of trimerization catalyst compounds based on the total weight of all trimerization catalyst compounds + isocyanate compounds.

The invention claimed is:

1. A process for making a polyisocyanurate comprising rigid foam having a density in the range 50-500 kg/m³, said process having a cream time >35 seconds and a snap cure behaviour and comprising combining and mixing at an isocyanate index of at least 200 the following components:
   a polyisocyanate composition comprising one or more polyisocyanate compounds;
   a catalyst composition comprising at least a trimerization catalyst compound in an amount of at least 50 wt % based on the total weight of all catalyst compounds in the catalyst composition;
   an isocyanate-reactive composition comprising at least a low molecular weight (MW) polyol having a MW below 200 g/mol in an amount of 0.1 up to 30 wt % based on the total weight of the isocyanate-reactive composition;
   one or more blowing agents comprising at least 50 mol % water based on the total molar amount of all blowing agents;
   optionally one or more surfactants, one or more flame retardants, one or more antioxidants or combinations thereof;
   wherein the wt % of the trimerization catalyst compounds is <0.5 wt % based on the total weight of the trimerization catalyst compounds and the polyisocyanate composition.

2. The process according to claim 1, wherein the cream time is >45 seconds.

3. The process according to claim 1, wherein the isocyanate index is higher than 220.

4. The process according to claim 1, wherein the wt % of the trimerization catalyst compounds is preferably <0.45 wt % based on the total weight of the trimerization catalyst compounds and the polyisocyanate composition.

5. The process according to claim 1, wherein the wt % of the trimerization catalyst compounds is <0.30 wt % based on the total weight of the trimerization catalyst compounds and the polyisocyanate composition.

* * * * *